(12) United States Patent
Silverman

(10) Patent No.: US 7,827,940 B2
(45) Date of Patent: Nov. 9, 2010

(54) MODULAR ENCLOSURE SYSTEM

(76) Inventor: Stephen Silverman, 37-8 Woodlake Rd., Albany, NY (US) 12203

(*) Notice: Subject to any disclaimer, the term of this patent is extended or adjusted under 35 U.S.C. 154(b) by 894 days.

(21) Appl. No.: 11/693,337

(22) Filed: Mar. 29, 2007

(65) Prior Publication Data

US 2008/0236510 A1    Oct. 2, 2008

(51) Int. Cl.
- *A01K 1/02* (2006.01)
- *A01K 1/03* (2006.01)
- *A01K 31/06* (2006.01)

(52) U.S. Cl. ................................. 119/474

(58) Field of Classification Search .......... 119/474, 119/481, 452, 491, 498, 461, 501; 52/79.12, 52/79.5, 481.2, 764, 767; 135/121, 144, 135/146, 157, 120.3, 909; 446/108, 110, 446/111, 112, 114, 126
See application file for complete search history.

(56) References Cited

U.S. PATENT DOCUMENTS

| | | | | |
|---|---|---|---|---|
| 2,799,118 A | * | 7/1957 | Lullo | ............... 446/112 |
| 2,960,249 A | | 11/1960 | Walsh | |
| 3,465,487 A | * | 9/1969 | Coste et al. | ............... 52/241 |
| 4,016,833 A | | 4/1977 | Ray | |
| 4,129,975 A | * | 12/1978 | Gabriel | ............... 52/655.2 |
| D278,110 S | * | 3/1985 | Boland, II | ............... D7/708 |
| 4,917,047 A | * | 4/1990 | Wazeter, III | ............... 119/474 |
| 4,966,097 A | | 10/1990 | Rosenberger | |
| 5,839,248 A | * | 11/1998 | Liang | ............... 52/655.2 |
| 6,502,708 B2 | * | 1/2003 | Daniel | ............... 211/189 |
| 6,832,580 B2 | | 12/2004 | Marchioro | |
| 2005/0034679 A1 | * | 2/2005 | Link | ............... 119/474 |
| 2007/0000447 A1 | * | 1/2007 | Jakubowski et al. | ......... 119/453 |

* cited by examiner

*Primary Examiner*—Timothy D Collins
*Assistant Examiner*—Monica Williams
(74) *Attorney, Agent, or Firm*—Heslin Rothenberg Farley & Mesiti P.C.

(57) ABSTRACT

A modular enclosure system, for example, for housing plants and/or animals is provided. The enclosure system includes a frame assembly having a plurality of vertical and horizontal members, and a plurality of connectors adapted to engage the horizontal and vertical members. The members include longitudinal projections or ribs adapted to engage a plurality of panel assemblies. The panel assemblies include first ends adapted to pivotally engage a rib of one member and a second end having a releasable locking mechanism adapted to engage a rib of a member. The enclosure may be used for any type of storage or housing, but is uniquely adapted to house animals, for example, pets, or plants. Aspects of the invention also include a structural system having horizontal and vertical members and connectors adapted to engage the members.

25 Claims, 12 Drawing Sheets

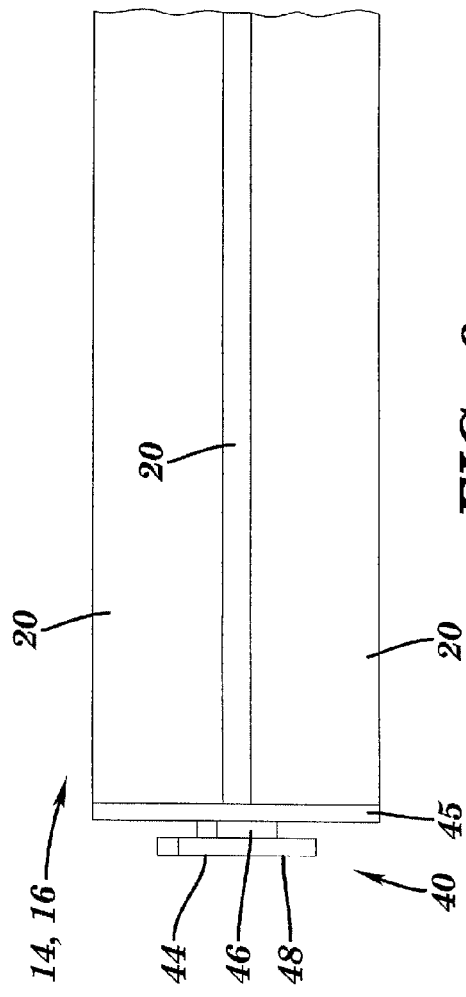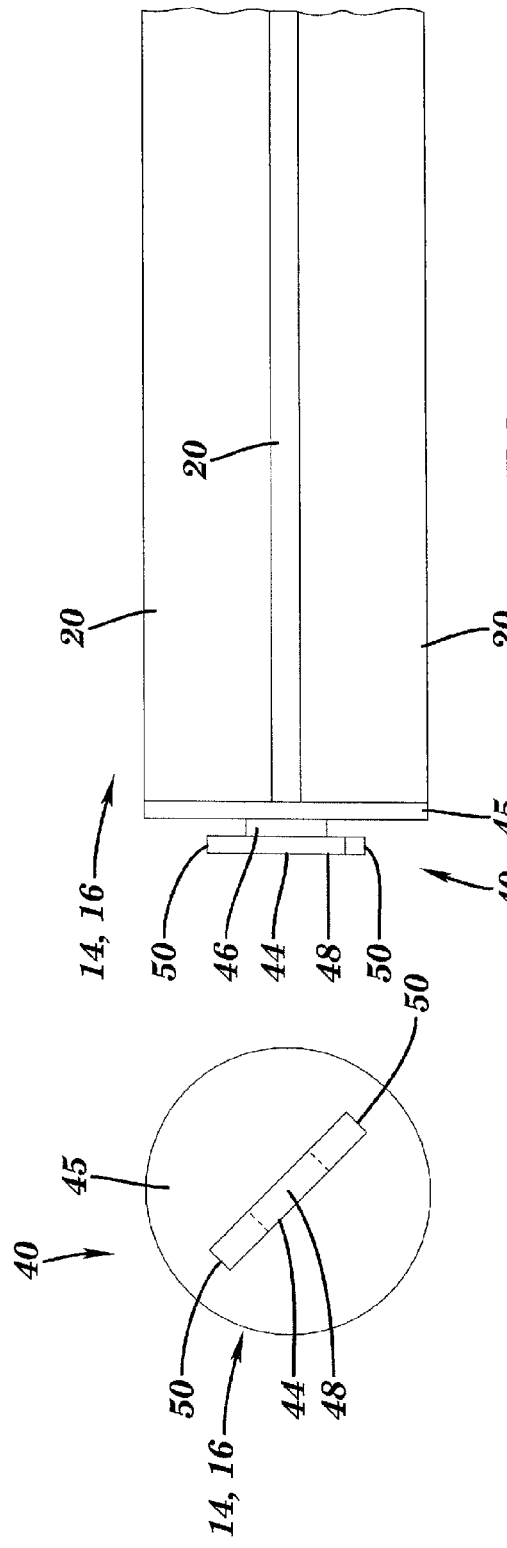

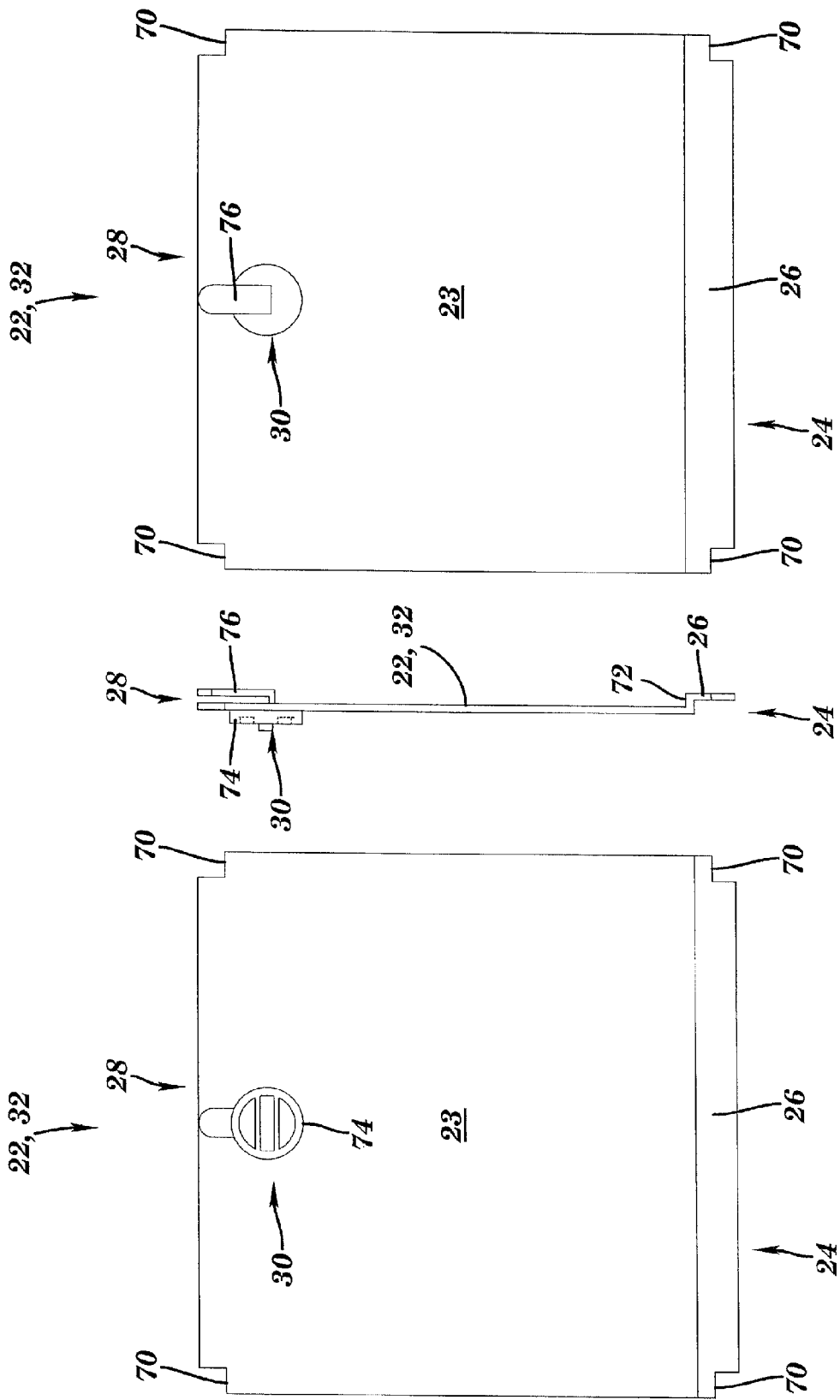

US 7,827,940 B2

MODULAR ENCLOSURE SYSTEM

TECHNICAL FIELD

The present invention is generally related to the field of modular enclosures, but is more specifically related to modular enclosures for housing animals, such as, pets; housing plants; or for storage.

BACKGROUND OF THE INVENTION

Space is typically at a premium. Large and small companies and homeowners are often confronted by problems of limited space; this includes space for storage and space for housing. This issue is relatively acute when housing animals and plants, for example, for cultivation, for husbandry, for research, or for retail sale, that is, in pet stores. Numerous enclosures have been provided to address this need. For example, U.S. Pat. Nos. 2,960,249; 4,016,833; 4,966,097; and 6,832,580, among others, disclose various modular enclosures and cages that can be used for storage and for housing animals. However, there exists a need in the art for a multi-functional modular enclosure system that is easily expandable and adaptable to a broad range of uses. Aspects of the present invention provide a modular enclosure system that addresses this need while overcoming the disadvantages of the prior art.

SUMMARY OF THE INVENTION

One aspect of the present invention is a modular enclosure system including a frame assembly comprising a plurality of vertical members, a plurality of horizontal members, and a plurality of connectors adapted to engage the horizontal members and the vertical members, wherein the horizontal members and the vertical members include longitudinal projections; and a plurality of panel assemblies adapted to removably mount to the frame assembly, wherein at least one of the plurality of panel assemblies comprises a first end adapted to pivotally engage a first longitudinal projection, and a second end, opposite the first end, having a releasable device adapted to engage a second longitudinal projection. In one aspect, the plurality of panel assemblies comprise a planar section, and the first end comprises a horizontal section substantially perpendicular to the planar section and a vertical section substantially perpendicular to the horizontal section, the vertical section adapted to pivotally engage the first longitudinal projection.

The modular enclosure according to aspects of the invention may be used to house animals, to house plants, to house animals and plants, or for storage. One aspect of the invention is a greenhouse, another aspect is a terrarium, and another aspect comprises a biosphere for housing a complete ecological system.

Another aspect of the invention is a structural system having a plurality of elongated members having opposite ends; and a plurality of connectors adapted to engage the ends of the elongated members to provide a structure. The structural system may provide at least a two-dimensional structure. The elongated members may be cruciform in cross section and the plurality of connectors may comprise polyhedrons having a plurality of faces adapted to receive the ends of the plurality of elongated members. The structural system may also include a plurality of panels adapted to engage the plurality of elongated members.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 5 is a side elevation view of the end of the member shown in FIG. 4.

FIG. 6 is a top plan view of the end of the member shown in FIG. 4, which is identical to the bottom view.

FIG. 7 is an end elevation view of the end of the member shown in FIG. 4.

FIG. 11A is a front plan view of a panel shown in FIG. 3.

FIG. 11B is a side elevation view of the panel shown in FIG. 11A.

FIG. 11C is a rear plan view of the panel shown in FIG. 11A.

DETAILED DESCRIPTION

Figure 1:
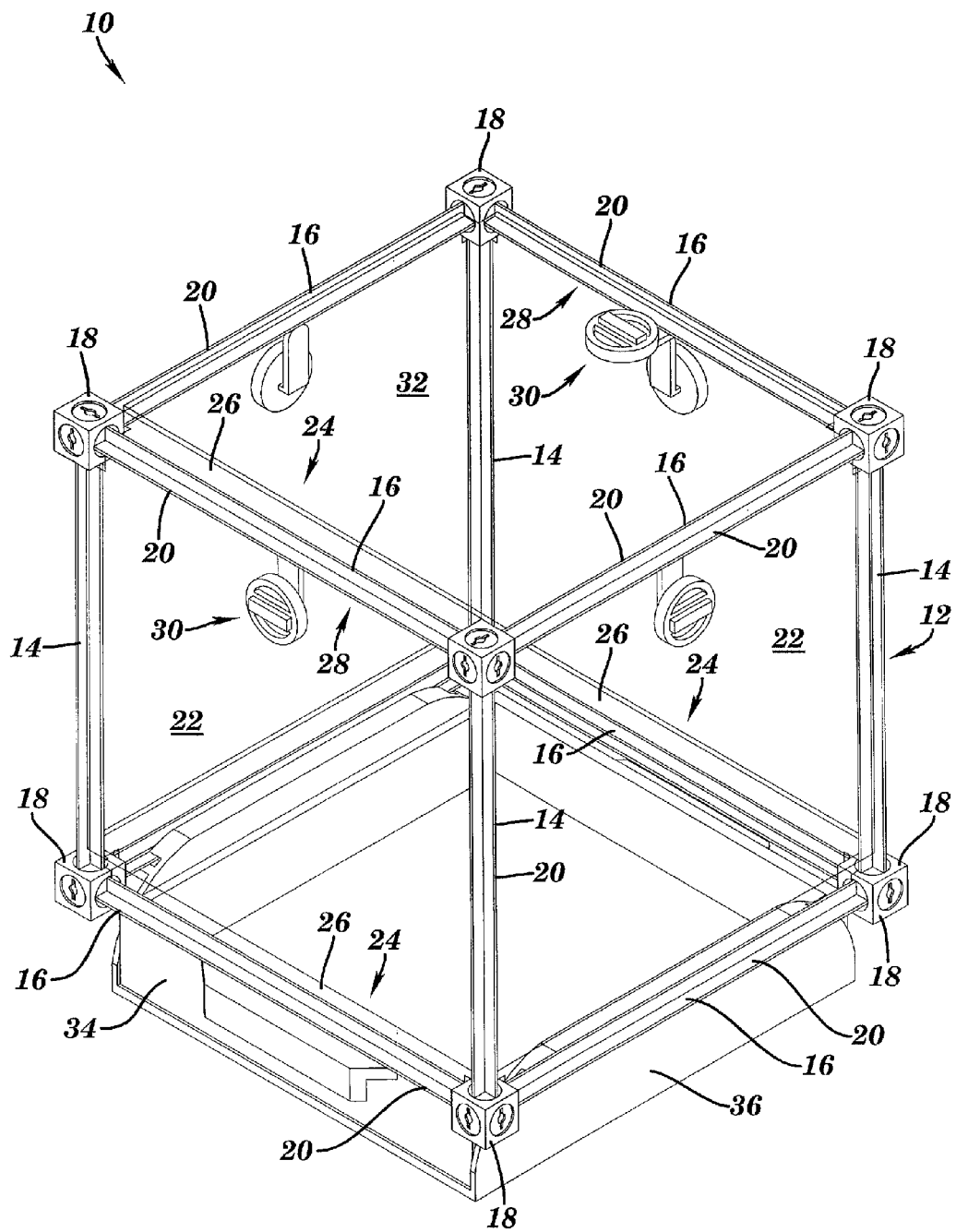
FIG. 1 is a perspective view of a modular enclosure system according to one aspect of the invention.
Figure 2:
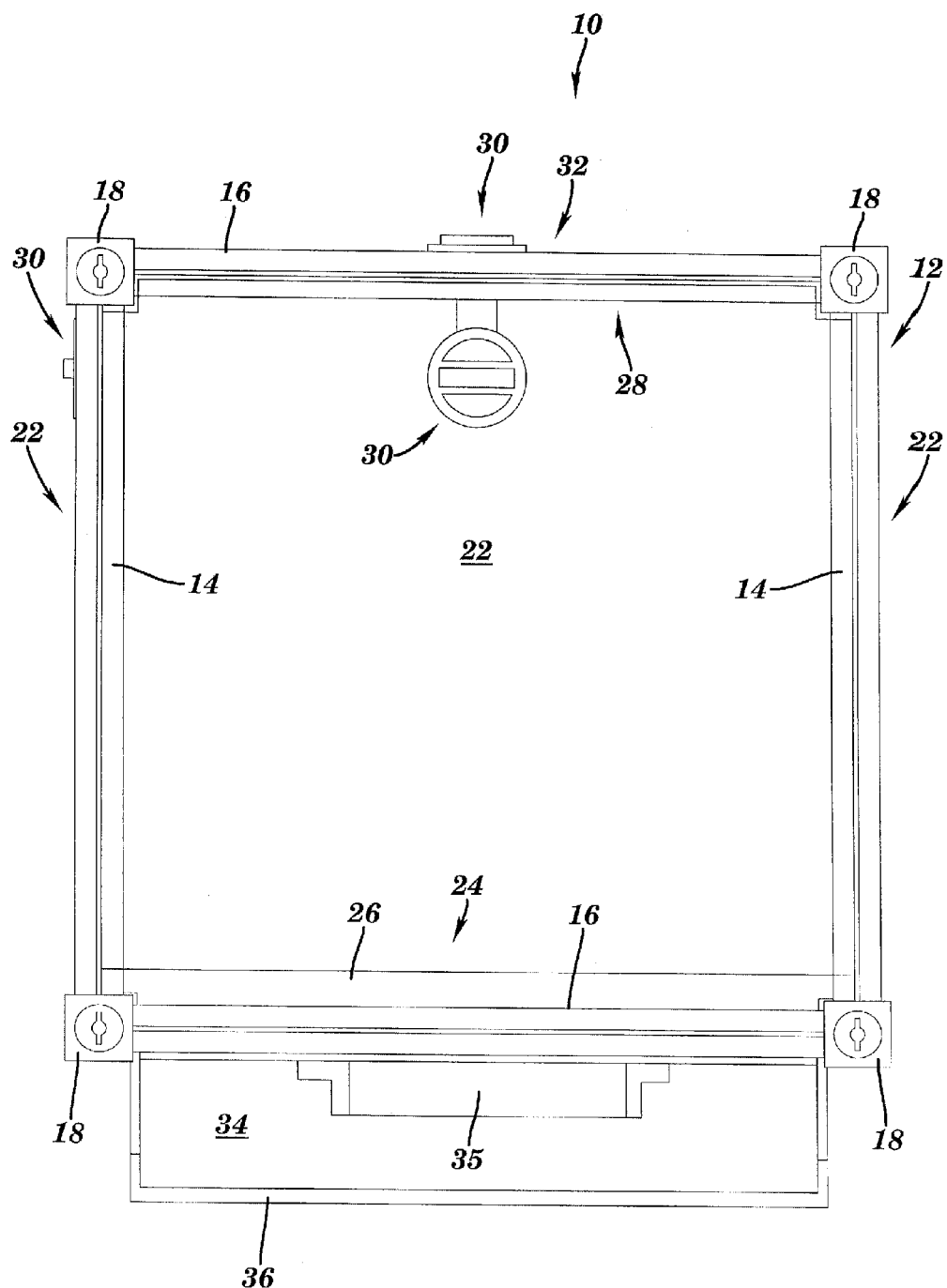
FIG. 2 is a front elevation view of the modular enclosure system shown in FIG. 1.
Figure 3:
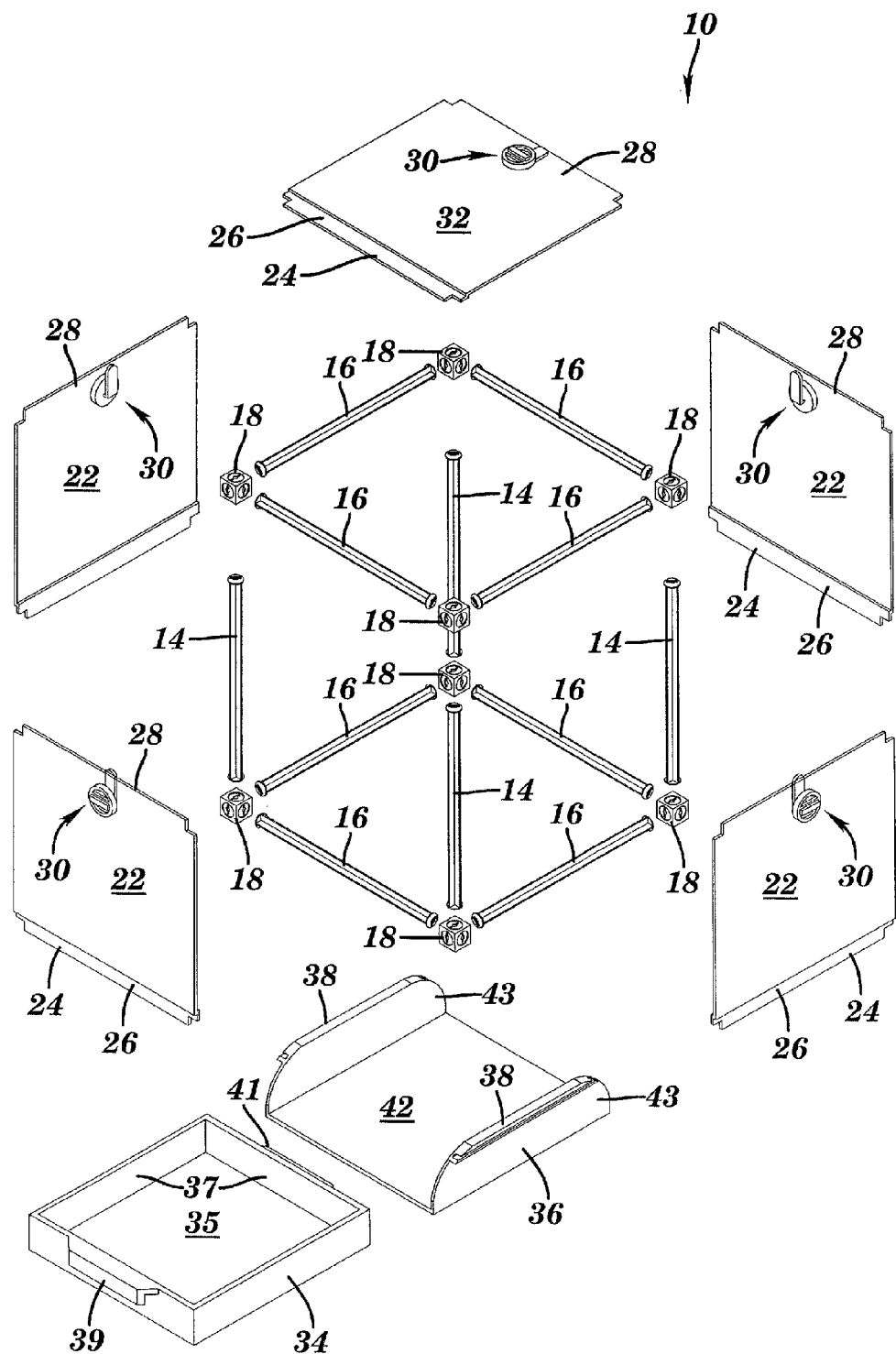
FIG. 3 is an exploded perspective view of the modular enclosure system shown in FIG. 1.

FIG. 1 is a perspective view of a modular enclosure system 10 according to one aspect of the invention. Enclosure system 10 may typically provide enclosures for housing animals, for example, a pet cage, such as, for dogs, cats, birds, or other small pets; an enclosure for plants, for example, for a greenhouse or terrarium; a combination of plants and animals, for example, providing a habitat for flora and fauna, an enclosure for storage; or a combination thereof. The modular enclosure system 10 includes a frame assembly 12 comprising a plurality of vertical members 14, a plurality of horizontal members 16, and a plurality of connectors 18 adapted to engage horizontal members 14 and vertical members 16. In one aspect, vertical members 14 and horizontal members 16 may be substantially identical in form and function. According to aspects of the present invention, at least one of the vertical members 14 and the horizontal members 16 include a longitudinal projection or rib 20, that is, a rib or projection from member 14 or 16 that extends in a longitudinal direction at least partially along the length of member 14 or 16. Detailed views of these longitudinal projections 20 are provided below in, for example, FIGS. 4 through 7. FIG. 2 is a front elevation view of the modular enclosure system 10 shown in FIG. 1. FIG. 3 is an exploded perspective view of the modular enclosure 10 shown in FIG. 1.

Modular enclosure system 10 also includes a plurality of side panels or doors 22 adapted to removablely mount to frame assembly 12. At least one of the plurality of side panels 22 comprises a door assembly having a first end 24 adapted to pivotally engage longitudinal projection 20 of either horizontal member 16 and vertical member 14, and a second end 28, opposite first end 24, having a releasable frame-assembly-engaging device 30, for example, a locking mechanism. As shown in FIGS. 1-3, first end 24 may include a longitudinal projection 26 adapted to pivotally engage rib or longitudinal projection 20 on horizontal member 16 and vertical member 14. Modular enclosure system 10 may also include at least one top panel or cover 32. Top panel 32 may be substantially identical to side panel 22 and may also have a first end 24 adapted to pivotally engage longitudinal projection 20 of at least one of the horizontal members 16 and the vertical members 14, and a second end 28, opposite first end 24, having a releasable frame-assembly-engaging device 30.

As shown most clearly in the perspective view of FIG. 3, the ends of vertical members 14 and horizontal members 16 are adapted to engage connectors 18, for example, releasably engage connectors 18 whereby frame assembly 12 may be disassembled, reassembled, added to, or removed from, as needed. That is, according to aspects of the invention, frame assembly 12 may be augmented to provide a plurality of enclosures, for example, in either a horizontal direction or a vertical direction. Though members 14 and 16 may be connected to connectors 18 by a variety of means, one means of engaging members 14 and 16 will be discussed in detail below.

Figure 12:
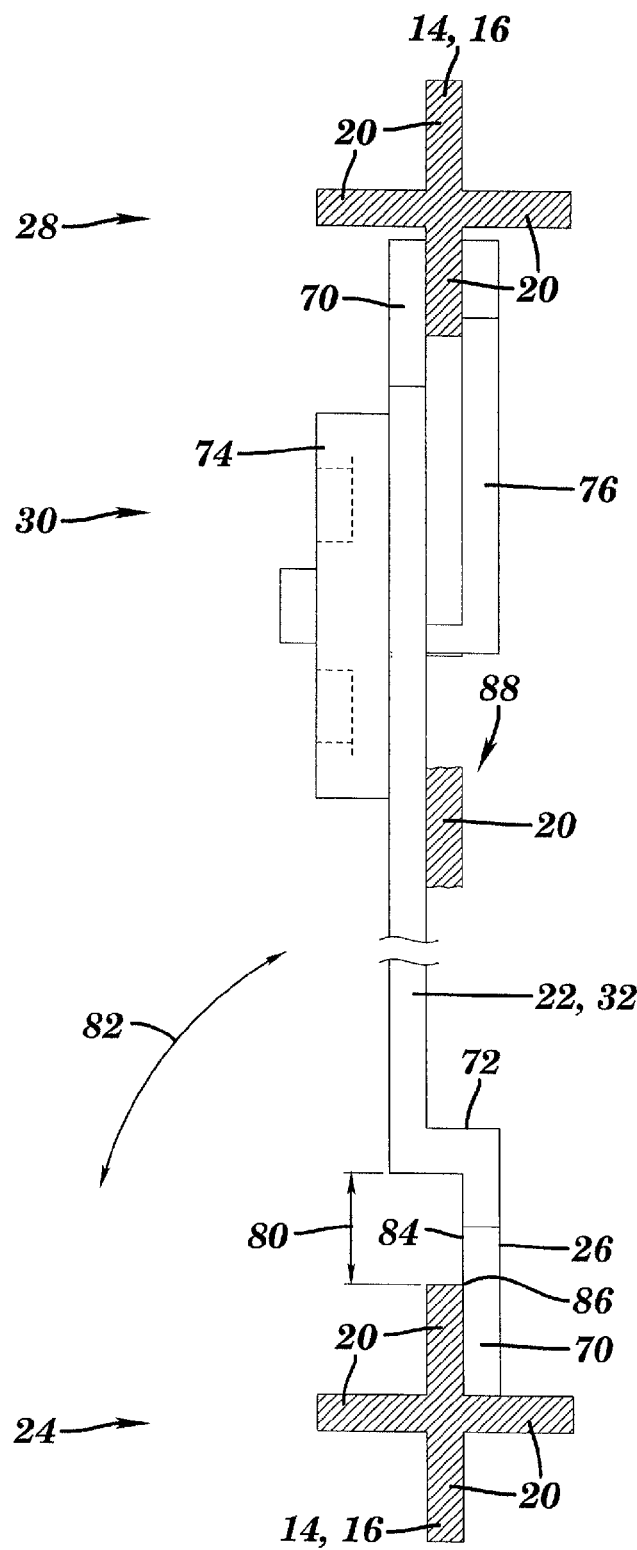
FIG. 12 is a side elevation view, partially in cross section, of a panel shown in FIG. 3 illustrating engagement with the horizontal or vertical members shown in FIG. 3.

As noted above, according to aspects of the invention, at least one of side panels 22 and top panel 32 are adapted to pivotally engage vertical member 14 or horizontal member 16. FIG. 12, discussed below, presents a side elevation view of an engagement of a panel 22 and a vertical or horizontal member 14, 16 according to one aspect of the invention.

In another aspect of the invention, as shown in FIGS. 1-3, enclosure assembly 10 may also include one more trays 34 mounted to the bottom of frame assembly 12. Tray 34 may be positioned to collect droppings or waste from animals or to hold soil for plants, or for storage, among other functions. Trays 34 may comprise a square or rectangular box having a bottom 35, sides 37, and an open top. According to aspects of the invention, tray 34 may be easily removed or installed below frame assembly 12, for example, by means of a front handle 39 or a rear handle 41. In one aspect, front handle 39 and rear handle 41 may be engagable whereby two or more trays 34 may positioned in a row of enclosures 10 and may have at least one front handle 39 engaged with at least one rear handle 41. According to this aspect, the two or more trays 34 thus engaged may be accessed or removed by pulling on a front handle 39 of a front tray 34, in a train-like fashion. Details of this engagement are provided in FIG. 14 below. As shown in FIGS. 1-3, tray 34 may be mounted in a tray holder 36 having a bottom 42 and sides 43. Tray holder 36 may be removablely mounted to frame assembly 12, for example, by means of side rails 38 mounted to sides 43 adapted to engage horizontal members 16, for instance, adapted to slidably engage ribs 20 of members 16. Details of this engagement of tray holder 36 with member 16 are provided in FIG. 15 below.

Members 14, 16; connectors 18; panels 22, trays 34 and tray holder 36 may be fabricated from any appropriate material, for example, a metal or a non-metal. In one aspect, these components may be made from one or more of the following metals: iron, steel, stainless steel, aluminum, titanium, nickel, magnesium, brass, bronze, or any other structural metal. In another aspect, these components may be made from wood or one or more of the following plastics: a polyamide (PA), for example, nylon; a polyamide-imide; a polyethylene (PE); a polypropylene (PP); a polyester (PE); a polytetraflouroethylene (PTFE); an acrylonitrile butadiene styrene (ABS); a polycarbonate (PC); or a vinyl, such as, polyvinylchloride (PVC), among other plastics. Members 14, 16 may be made from an extrudable metal or plastic. In one aspect panels 22 may be made from a translucent or transparent plastic.

Figure 4:
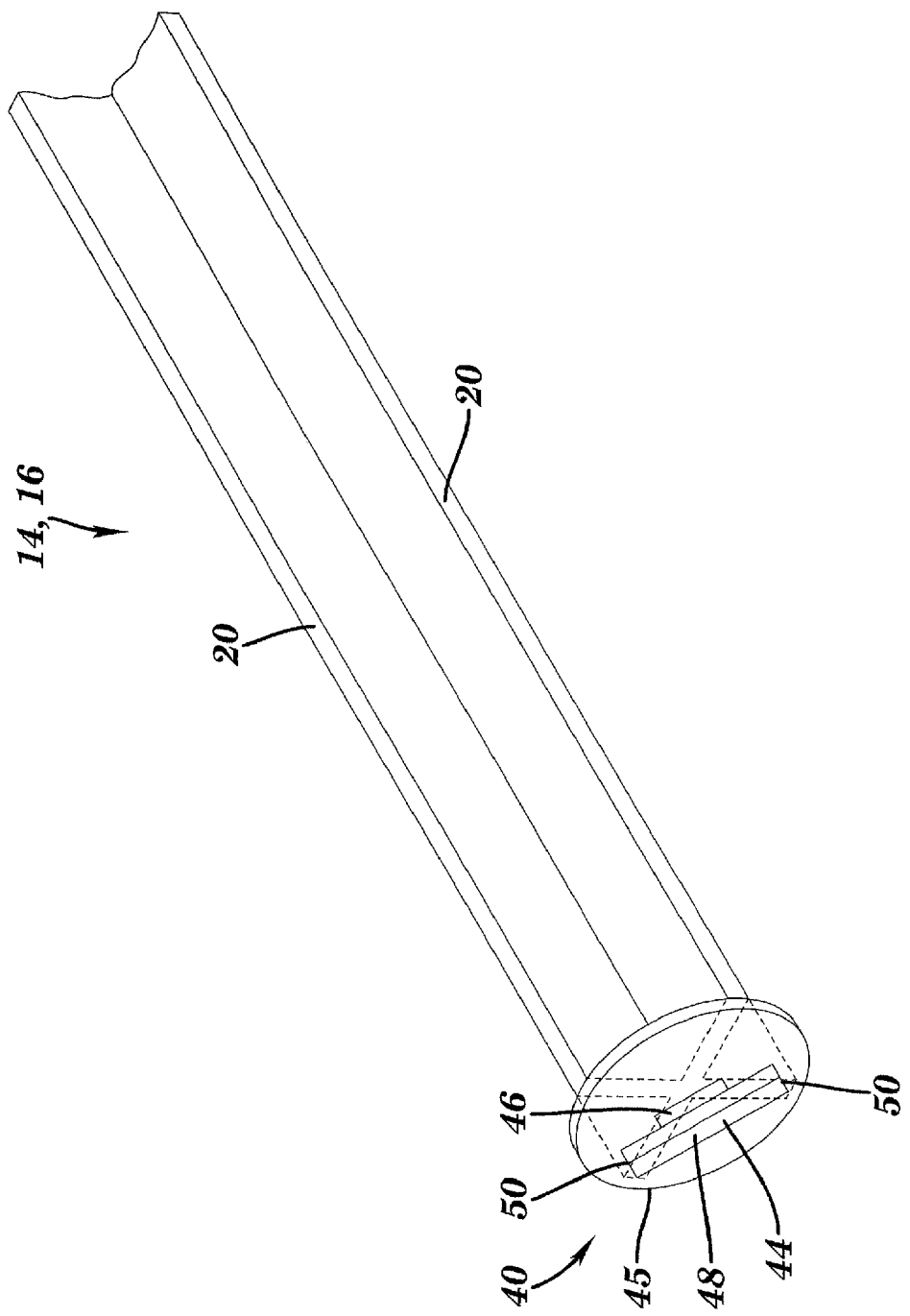
FIG. 4 is a perspective view of an end of a member shown in FIG. 3 according to one aspect of the invention.

FIG. 4 is a perspective view of an end of a vertical member 14 or a horizontal member 16 shown in FIG. 3 according to one aspect of the invention. FIG. 5 is a side elevation view, FIG. 6 is a top plane view, and FIG. 7 is an end elevation view of the end of a vertical member 14 or a horizontal member 16 shown in FIG. 4. As shown in FIGS. 4-7, members 14, 16 may comprise elongated members having a cruciform cross section with elongated projections or ribs 20. Though member 14, 16 shown in FIGS. 4-7 include a plurality of ribs 20, specifically, four ribs 20, according to one aspect of the invention members 14, 16 may include at least one projection or rib 20. For example, in one aspect, members 14, 16 may comprise an elongated cylindrical body having at least one rib 20 projecting from the elongated cylindrical body. In one aspect, members 14, 16 may comprise an elongated cylindrical body having 2 or more projecting ribs, or 3 or more projecting ribs. In the aspect of the invention shown in FIGS. 4-7, members 14, 16 are illustrated having four ribs 20 projecting from a cylindrical body, in this case, the ribs 20 comprise the cylindrical body.

As shown in FIGS. 4-7, members 14, 16 include some means 40 on either end of member 14, 16 that is adapted to engage connectors 18. According to one aspect of the invention, means 40 may comprise any conventional means for engaging an elongated member 14, 16 with a connector 18, for example, male-female friction fit (that is, an engagement analogous to Tinker Toys), an interlocking engagement, or an engagement utilizing one or more mechanical fasteners, such as, screws, bolts or spring-loaded detents. According to one aspect of the invention, regardless of the means 40, members 14, 16 may be easily engagable and disengagable with connectors 18 to facilitate engagement and disengagement, for example, with a minimum or no additional hardware and without the need for additional tools. In one aspect, members 14, 16 may interlock with connectors 18 and be releasable by means of relative movement of members 14, 16 and connectors 18. One means 40 for effecting engagement and disengagement of members 14, 16 with connector 18 is illustrated in FIGS. 4-7.

According to the aspect of the invention illustrated in FIG. 4-7, members 14, 16 include means 40 at either end having a circular plate or disk 45 and a projection or "key" 44 mounted to disk 45. As shown most clearly in FIGS. 5 and 6, disk 45 may be oriented substantially perpendicular to the axis of elongation of members 14, 16 and have an outside diameter substantially co-extensive with the width of ribs 20. In other aspects of the outside diameter of invention disk 45 may be smaller or larger than the width or height member 14, 16, for example, of ribs 20. As also shown in FIGS. 5-7, key 44 mounted in disk 45 may be substantially centrally mounted on disk 45 and include a central post 46 and a flange 48 having extensions 50. Post 46 and flange 48 may typically be cylindrical in shape, for example, circular or rectangular cylindrical; however, as shown in FIGS. 3-7, post 46 and flange 48 may be rectangular cylindrical. Extensions 50 may typically project substantially perpendicular to the axis of elongation of members 14, 16. It will be understood by those on the art, that post 46 and flange 48 may be shaped to facilitate fabrication and their intended use (as will be discussed below), for example, having appropriate chamfers, bevels, or rounded edges not shown in FIGS. 4-7, as is conventional. In one aspect, as shown most clearly in FIG. 4, key 44 may be angularly off-set from the direction of orientation of ribs 20. For example, the angular deviation of key 44 may be at least 15 degrees, but is typically about 45 degrees as shown in FIGS. 4-7. According to one aspect of the invention, this angular offset of key 44 from ribs 20 permits keys 44 on opposing ends of members 14, 16 to engage respective connectors 18 while maintaining the desired horizontal and vertical orientation of ribs 20.

Members 14, 16 may vary in length from about 1 inch to about 6 feet, but may typically have a length of between about 2 inches and about 24 inches. The width or height of members 14, 16 may vary from about 0.5 inches to about 3 feet, but may typically have a width or height of between about 1 inch and about 6 inches, for example, between about 1 inch and about 1.5 inches. The thickness of ribs 20, disk 45, and key 44 may vary from about 0.125 inches to about 1 foot, but may typically have a thickness of between about 0.125 inches and about 1 inch, for example, between about 0.125 inches and about 0.25 inches.

Figure 8:
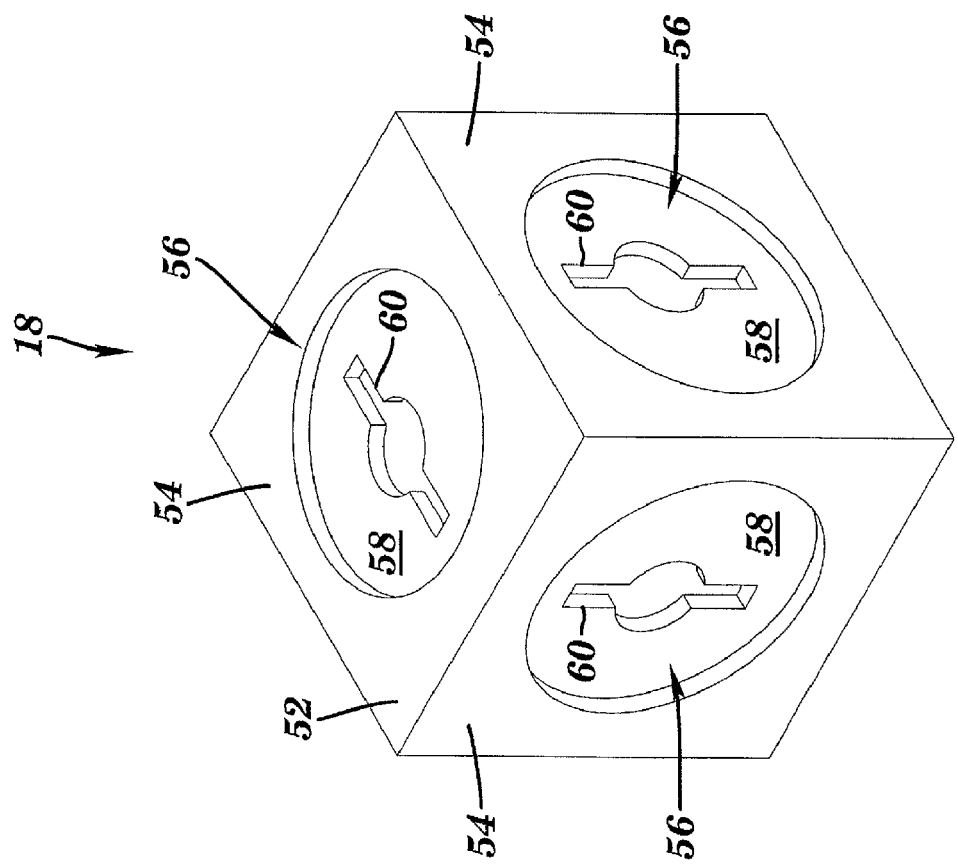
FIG. 8 is a perspective view of a connector shown in FIG. 3 according to an aspect of the invention.
Figure 10:
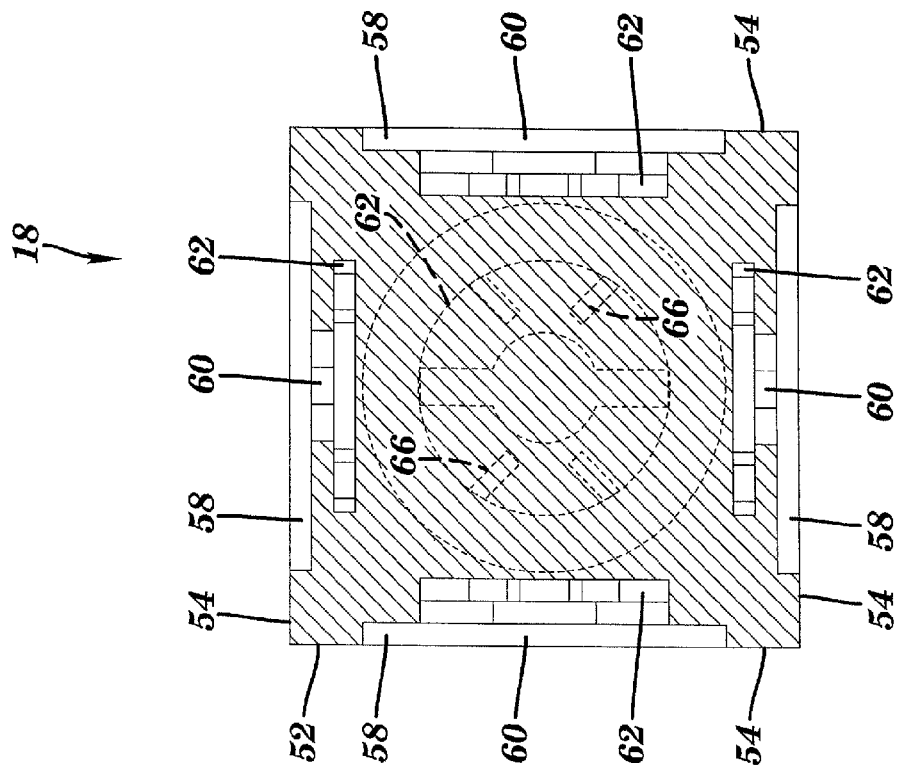
FIG. 10 is a cross-sectional view of the connector shown in FIG. 8 as viewed through section 10-10 in FIG. 9.
Figure 9:
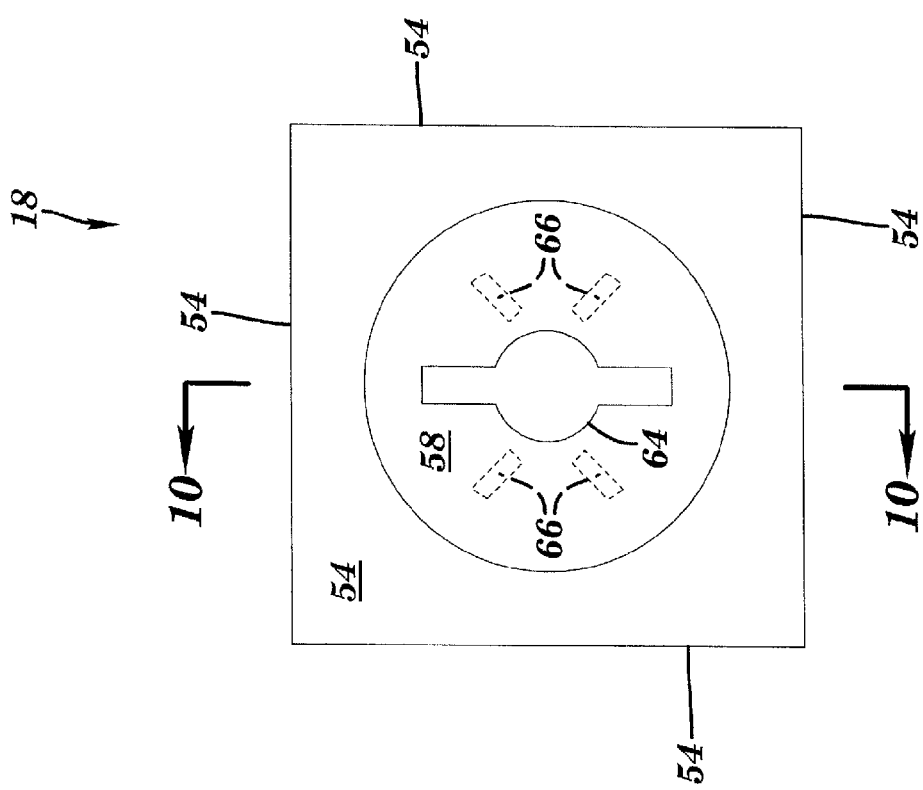
FIG. 9 is a side elevation view of the connector shown in FIG. 8, which is identical to the top view and to the bottom view of the connector shown in FIG. 8.

FIG. 8 is a perspective view of connector 18 shown in FIG. 3 according to one aspect of the invention. FIG. 9 is a side elevation view of connector 18, which may be substantially identical to the top view and to the bottom view of connector 18, and FIG. 10 is a cross-sectional view of connector 18 shown in FIG. 8 as viewed through section 10-10 in FIG. 9. As shown in FIGS. 8-10, connector 18 may comprise a substantially square body, polyhedron, or parallelepiped 52 having a plurality of sides 54. Though shown as a substantially equally sided polyhedron or parallelepiped in FIGS. 8-10, body 52 may also be spherical, rectangular, or even pyramidal (having 4 or more sides) in some aspects of the invention.

According to aspects of the invention, the plurality of sides 54 include means 56 adapted to receive members 14, 16 for example, receive and releasably engage members 14,16. As discussed above, with respect to means 40 in FIG. 4, means 56 may comprise any conventional means by which connector 18 can engage members 14, 16. However, FIGS. 8-10 illustrate one means 56 that may be employed according to one aspect of the invention.

As shown in FIGS. 8-10, in one aspect of the invention, connector 18 includes a means 56 adapted to receive key 44 of members 14, 16. In this aspect, means 56 includes a recess or depression 58 in a plurality of sides 54, typically, all the sides 54 of connector 18. Recess 58 may typically be circular or non-circular; however, in order to accommodate the aspect of the invention illustrated, recess 58 may be circular and at least about 0.0625 inches in depth. Recess 58 may have a depth as shallow as possible, for example, recess 58 may only be cosmetic. In order to accommodate key 44, connector 18 also includes an aperture or hole 60 in recess 58. In one aspect of the invention recess 58 may be omitted and aperture 60 may be located in sides 54. Aperture 60 is adapted to receive key 44 of members 14, 16, for example, receive and releasably engage key 44, as will be discussed below. The details of aperture 60 according to one aspect of the invention are illustrated in the cross section of connector 18 shown in FIG. 10.

As shown in FIG. 10, in one aspect, aperture 60 communicates with an internal cavity 62. Internal cavity 62 is adapted to receive key 44 of members 14, 16 and permit rotation of members 14, 16 when engaged with connector 18 whereby flange 48 is received by and rotated within cavity 62. According to an aspect of the invention, the rotation of key 44 within hole 60 and cavity 62 engages key 44 with hole 60 whereby members 14, 16 are fixedly mounted in connector 18. In one aspect of the invention, internal cavity 62 may comprise a complete circular cavity whereby flange 48 of key 44 may be rotated at least 360 degrees within cavity 62. In another aspect, cavity 62 may comprise only a portion of a circle, for example, one or more sectors of a circular cavity, that is, one or more sectors sufficient to engage at least a portion of extensions 50 of flange 48 of key 44. In another aspect, internal cavity 62 may comprise a set of portions or sectors of circle spanning at least 15 degrees, at least 30 degrees, or at least 45 degrees or more. According to one aspect, when internal cavity 62 is provided as a portion of a circular cavity, the extents of cavity 62 may comprise stops to the rotation of flange 48, for example, as indicted in FIGS. 9 and 10 as stops 66 (shown in phantom). As discussed above with respect to key 44, in one aspect, the positioning of stops 66 at about 45 degrees from the direction of ribs 20 permits engagement of key 44 at either end of member 14, 16 with its respective connector 18 while maintaining the desired vertical and horizontal orientation of ribs 20.

In another aspect of the invention, recess 58 may include an internal recess 64 in the surface of recess 58 to permit the unencumbered rotation of post 46. In one aspect, recess 64 may comprise a circular recess, for example, permitting substantially 360-degree rotation of post 46. In another aspect, recess 64 may comprise a portion of a circle or sector adapted to permit as much rotation of key 44 and post 46 as desired, as discussed above, for example, allowing at least about 15 degrees of rotation of post 46.

Internal cavity 62 or flange 48 may be adapted to promote substantially fixed engagement of members 14, 16 and connector 18. For example, in one aspect, at least one of internal cavity 62 and flange 48 may include a recess or depression engagable with a projection on an opposing surface of internal 62 cavity or flange 48 to promote engagement, for instance, in a manner commonly referred to in the mechanical arts as a "detent." In another aspect, at least one of internal cavity 62 and flange 48 may vary in size whereby friction between mating surfaces is enhanced to provide a wedging effect between the mating surfaces. Other means of promoting engagement between members 14, 16 and connector 18 will be apparent to those of skill in the art.

Connectors 18 may vary in length or width from about 1 inch to about 3 feet, but may typically have a length or width of between about 1 inch and about 6 inches, for example, about 1.25 inches and about 2.5 inches. The diameter of recess 58 may vary from about 1 inch to about 3 feet, but may typically have a diameter of between about 1 inch and about 6 inches, for example, about 1 inch and about 2.25 inches. The width of aperture 60 may vary from about 0.125 inches to about 3 feet, but may typically have a thickness of between about 0.125 inches and about 3 inches, for example, about 0.2 inches and about 0.4 inches.

FIGS. 11A, 11B, and 11C illustrate side panel 22 or top panel 32 shown in FIG. 3. FIG. 11A is a front plan view of a panel 22, 32 shown in FIG. 3. FIG. 11B is a side elevation view and FIG. 11C is a rear plan view of the panel 22, 32 shown in FIG. 11A. Since top panel 32 may be substantially identical to side panel 22, the following discussing will refer only to panel 22, thought it is to be understood that this discussion also applies to top panel 32.

As shown in FIGS. 11A-C and as discussed above, panel 22 includes a substantially planar section 23 having a first end 24 with an offset projection 26, and a second end 28 having a frame-assembly-engaging device 30, for example, a locking mechanism. As will be explained in further detail below with respect to FIG. 12, offset projection 26 is adapted to engage a rib 20 of members 14, 16, for example, rotatably engage rib 20. As shown in FIGS. 11A and 11C, projection 26 and second end 28 may include notches or cutouts 70 to eliminate interference with connectors 18 when panel 20 is mounted to frame assembly 12. As shown most clearly in FIG. 11B, longitudinal projection 26 may be mounted to planar section 23 by horizontal projection or rib 72. As will be discussed below with respect to FIG. 12, rib 72 and projection 26 are adapted to engage rib 20 of members 14, 16.

Adjustable frame-assembly-engaging device or locking device 30 may be any conventional device adapted to engage rib 20 of members 14, 16 when panel 22 is mated with frame assembly 12. For example, locking device 30 may have a rotatable handle 74 and a latch mechanism 76 adapted to respond to the rotation of handle 74 to engage rib 20 of member 14, 16.

Panels 22 may be transparent, translucent, opaque or a combination thereof. In one aspect, panels 22 may include inserts, for example, removable inserts comprising transparent windows or perforated barriers such as screens or wire cage segments. In one aspect, panel 22 may comprise a complete wire panel or cage, for example, a wire panel or cage formed in a shape similar to panel 22 shown in FIGS. 11A-11C. Panels 22 may typically be square or rectangular, though in one aspect when panels 22 are substantially square they may be mounted to frame assembly 12 in any orientation, for example, with device 30 on top or bottom or on the left or right. Panels 22 may vary in length or width from about 3 inches to about 12 feet, but may typically have a length or width of between about 3 inches and about 24 inches, for example, between about 6 inches and about 12 inches. The thickness of panel 22 may vary from about 0.03 inches to about 6 inches, but may typically have a thickness of between about 0.06 inches and about 1 inch, for example, between about 0.125 inches and about 0.25 inches.

FIG. 12 is a side elevation view, partially in cross section, of panel 22, 32 shown in FIG. 3 illustrating engagement of panel 22, 32 with horizontal or vertical members 14, 16 shown in FIG. 3 As shown in FIG. 12, first end 24 of panel 22, 32 includes a horizontal projection or rib 72 and elongated projection 26 extending from rib 72 adapted to engage rib 20 of first member 14, 16 and second end 28 having engaging device 30 adapted to engage second member 14, 16. It will be understood that though members 14, 16 are illustrated vertically displaced from each other in FIG. 12, depending upon the member 14 or 16 considered in FIG. 12, these members may be vertically displaced (for example, where panel 22, 32 corresponds to a vertically oriented panel) or horizontally displaced (for example, where panel 22, 32 corresponds to a horizontally oriented panel).

As shown in FIG. 12, first end 24 of panel 22, 32 engages rib 20 of member 14, 16 whereby panel 22, 32 is pivotally mounted to member 14, 16, that is, panel 14, 16 may rotate about rib 20 as indicated by double arrow 82. The bottom of rib 72 may be spaced from the top of rib 20 by a distance 80, for example, at least 0.125 inches, to allow panel 22, 32 the freedom to rotate without interfere from rib 20. However, distance 80 may vary from 0.125 inches to 6 inches without affecting the function of aspects of the invention. According to aspects of the invention, the outer surface 84 of extension 26 of panel 22, 32 may contact the upward extending rib 20 of member 14, 16 and may pivot about the top corner 86 of rib 20. In addition, when rotated into the position shown, for example, a vertical position, panel 22, 32 may contact at least one rib 20 of adjacent members 14, 16, as illustrated representatively by arrow 88 in FIG. 12. Moreover, when rotated into engagement with ribs 20, second end 28 of panel 22, 32 contacts rib 20 of the opposite member 14, 16, for example, the upper member in FIG. 12. According to aspects of the invention, second end 28 may be secured, for example, at least temporarily, to rib 20 by means of engaging device 30. For example, engaging device 30 can be rotated whereby latch mechanism 76 also engages rib 20 of member 14, 16 whereby second end 28 is retained between panel 22, 32 and latch mechanism 76. In another aspect, the bottom of rib 72 may contact rib 20, that is, distance 80 may be substantially zero. Moreover, projection 26 of panel 22 may be spaced from rib 20 (for example, vertically spaced from horizontal rib 20 as shown in FIG. 12) to provide some clearance (not shown) between projection 26 and rib 20, for instance, to allow unobstructed rotation of panel 22 about rib 20. For example, the clearance between projection 26 and rib 20 may be between about 0.125 inches and about 2 inches.

Figure 13:
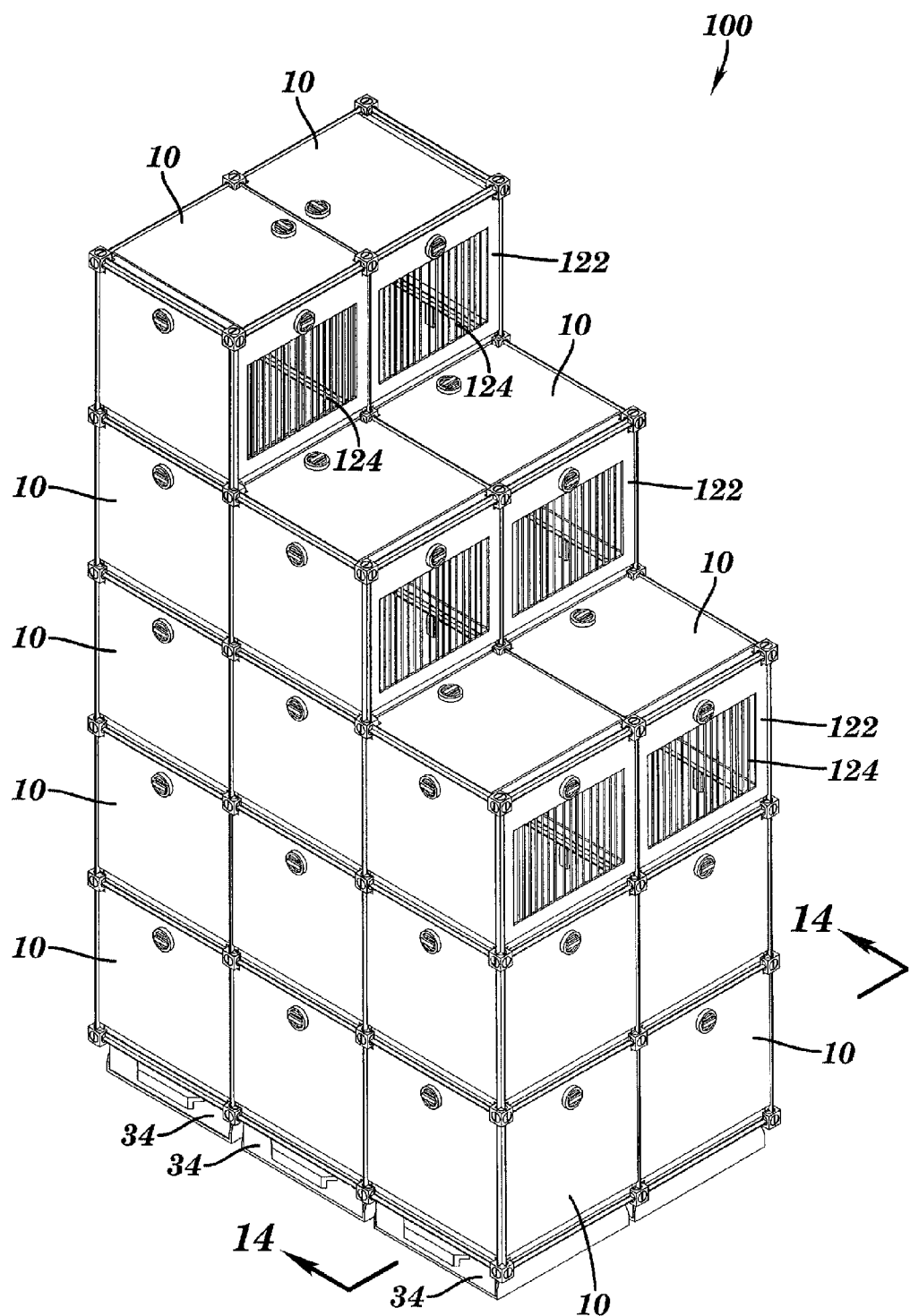
FIG. 13 is a perspective view of an assembly of multiple enclosure assemblies shown in FIG. 1 according to an aspect of the invention.

FIG. 13 is a perspective view of an assembly 100 of multiple enclosure assemblies 10 shown in FIG. 1 according to an aspect of the invention. Enclosure 100 may be used to house plants, animals, or a combination thereof, for example, a substantially complete biosphere-like enclosure. Enclosure assemblies 10 in FIG. 13 may comprise all the components and features of enclosures 10 described in FIGS. 1-12, for example, members 14, 16; connectors 18; and panels 22, 32 described previously. Though assembly 100 includes a multitude of enclosures 10, in one aspect of the invention, at least two enclosures 10 may be provided. Enclosures 10 may be arranged horizontally, for example, one adjacent to another or one in front of another, or vertically, for example, one above or below another. Though in one aspect, enclosures 10 may be arrayed in at least one dimension, for example, side by side, or at least two dimensions, that is, side by side and one above the other, as shown in FIG. 13, assembly 100 may include enclosures 10 arrayed in three dimensions, that is, in two orthogonal horizontal dimension and one vertical dimension.

As shown in FIG. 13, assembly 100 may include multiple trays 34 and multiple tray holders 36, as described previously. As shown and described with respect to FIG. 14 below, trays 34 may be interconnected, for example, whereby at least a first tray may be connected with a second tray and removed as a train of trays 34. Though in FIG. 13 trays 34 and tray holders 36 are shown mounted to horizontal members 14 below the lowest enclosures 10, trays 34 and tray holders 36 may be mounted at any elevation of horizontal members 14.

As shown in FIG. 13, panels 22, 32 may comprise panels 122 adapted to receive a perforated panel, latticework, or wire cage 124. Panels 122 may also be similar to and have all the attributes of panels 22, 32 described above. Latticework 124 may be removable, for example, latticework 124 may be removable and replaceable by a solid, unperforated panel (not shown). Panel 122 may include guides or slots (not shown) adapted to receive latticework 124, which may be retained by conventional hardware, for example, screws or clasps, and the like. In one aspect, panel 22 or 122 may comprise a complete wire panel or cage, for example, a wire panel or cage formed in a shape similar to panel 22 shown in FIGS. 11A-11C. In one aspect, latticework or cage 124 or panel 22, 122 may comprise horizontal bars, vertical bars, or both horizontal and vertical bars. For example, in one aspect, latticework or cage 124 may be substantially square and include a plurality of horizontal or vertical bars. Due to its square shape, the direction of the bars may be rotated to vary the orientation of the bars. For example, in one aspect, the bars of cage 124 may be vertical, as desired for canaries and finches, and cage 124 can be removed and rotated 90 degrees so that the bars can be oriented horizontally, as desired for parakeets and cockatiels.

As shown in FIG. 13, the arrangement of enclosures 10 in assembly 100 may include one or more internal members 14, 16 to which panels 22, 32, or 122 are not mounted, whereby member 14, 16 provides an unencumbered span between connectors 18. In one aspect of the invention, these unencumbered spans of members 14, 16, may provide surfaces that can be utilized by the animals or plants enclosed in assembly 100 or upon which to mount ancillary equipment. For example, an unencumbered horizontal member 14 may provide a perch for bird or a bar from which an animal, such as a monkey, can swing. The unencumbered members 14, 16 may also provide a bar or pole for suspending ancillary equipment, for example, feeding, gnawing, watering, heating, cooling, or recreational devices, such as, a swing, for animals; or watering, heating, or lighting devices for plants, among other devices. Panels 22 and 122 may also be used for mounting one or more of these devices, for example, by means of suction cups, an adhesive, or mechanical fasteners. Unencumbered vertical members 16 may provide supports for plants growing in enclosure 100.

In one aspect, assembly 100 may include one or more horizontal plates or panels, such as, floor or ceiling panels (not shown). The panels may be mounted to horizontal ribs 20 of horizontal members 14 to provide a platform within enclosure assembly 100, for example, a platform to hold plants, soil for plants, or animals. The panel or platform may be perforated or unperforated, for example, a wire mesh. The horizontal panels may not be rotatably mounted to a horizontal member 14. In one aspect, a panel 22 or 122 a shown in FIGS. 11A-11C, may also be inserted into an enclosure 11 as a horizontal floor or ceiling panel, for example, one that is pivotally mounted to horizontal members 14. The floor or ceiling panel 22 or 122, with or with a cage or grill portion, may be keep animals from accessing tray 34, for example, when tray 34 comprise a waste collection box or litter box. When used as a floor or ceiling panel, panel 22 or 122 may not include a locking device 30.

Enclosure assembly 100 may have multiple uses and provide multiple functions. For example, one set of enclosures 10 in assembly 100 may have light transmitting panels 22 and function as a greenhouse, for instance, the external enclosures 10 that are more likely to be exposed to direct sunlight or lamp light. Another set of enclosures 10 may be used to house animals, for example, a central portion interior of the greenhouse portion may be used to house animals. In one aspect of the invention, a portion of assembly 100 may also be used as an aquarium for fish, turtles, reptiles, and related aquatic animals. For example, a stand-alone aquarium, for example, a tank, may be inserted into assembly 100, or panels 22, 122 and members 14, 16 may be designed to hold water, for example, with the insertion of appropriate liquid retaining devices, such as, seals or gaskets. In one aspect, one or more enclosures 10 or an assembly 100 may be mounted on top of an aquarium tank. In another aspect, translucent, transparent, or opaque solid panels 22, 122 may be used to isolate the animals from the plants, for example, from poisonous plants. Another set of enclosures 10 in assembly 100 may be used for storage, for example, a portion of assembly 100 may be isolated from the animals and plants above, below, or on the side by translucent, transparent, or opaque panels and used for storage, for example, of pet food, pet supplies, or related equipment.

In another aspect of the invention, when used to house plants or animals or for storage, enclosure 10 or enclosure assembly 100 may be used without trays 34 or tray holders 36 and enclosures 10 or assembly 100 may be placed directly on a surface, such as, on the ground, on the floor, or on a shelf, and the like, for example, wherein frame assembly 12 contacts the surface. In one aspect, plant seedlings may be placed in soil outdoors (or indoors) and beneath and protected by one or more enclosures 10 until there is no or limited chance of frost. The one or more enclosures 10 or assembly 100 may be held down to the ground by stakes that engage frame assembly 12. The one or more enclosures 10 or assembly 100 may also be used as a "cold frame," that is, an enclosure to protect plants (or animals) during the winter months.

In one aspect, enclosure assembly 100 may require external structural reinforcement, for example, structural supports or retaining wires or cables. For example, eye hooks may be provided to members 14,16 where appropriate to which cables can be mounted to secure enclosure assembly 100 to the ground, floor, or to an adjacent structure.

Figure 14:
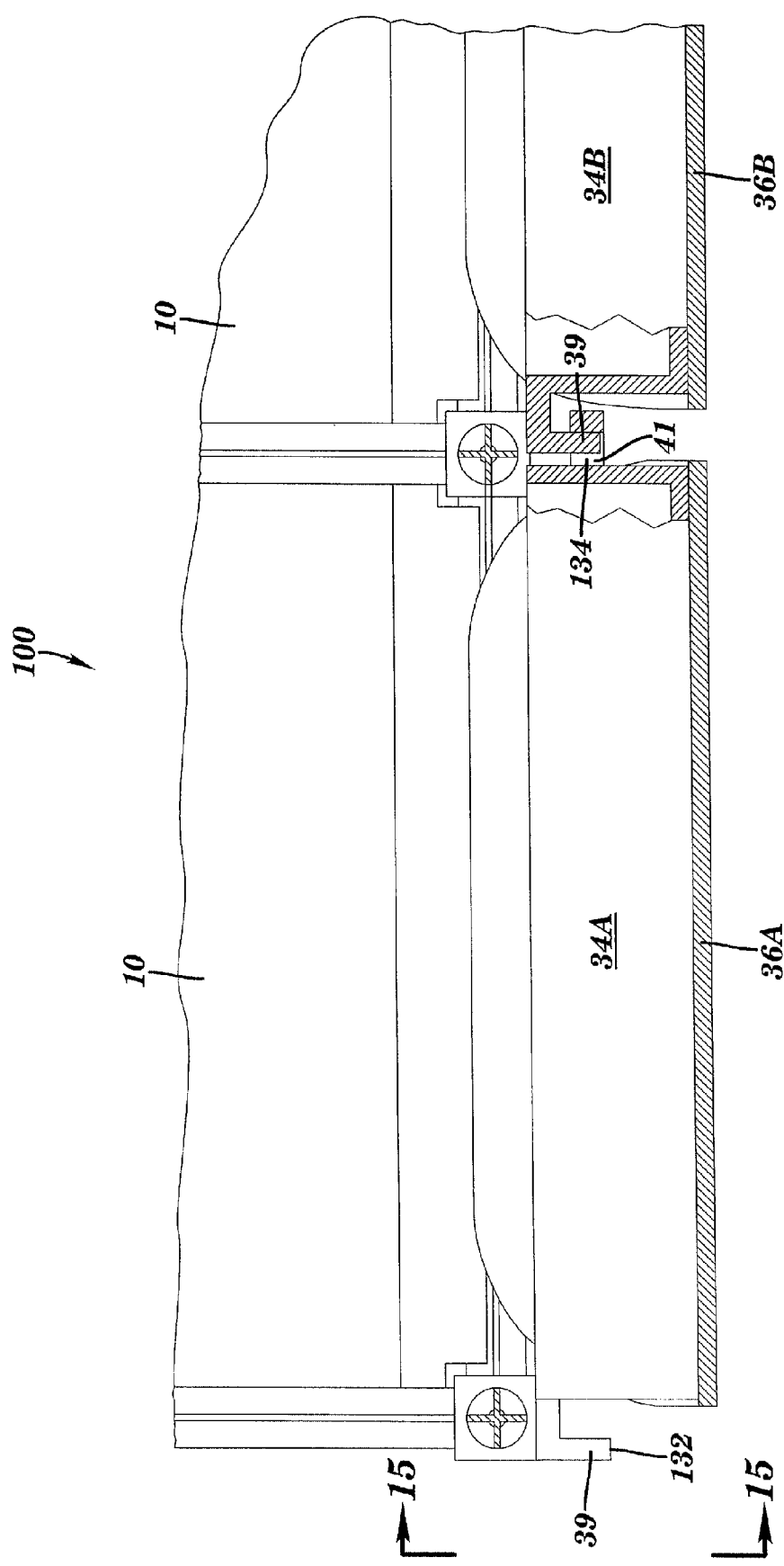
FIG. 14 is detailed side elevation view of the assembly shown in FIG. 13 as viewed along lines 14-14 in FIG. 13.

FIG. 14 is detailed side elevation view of enclosure assembly 100 shown in FIG. 13 as viewed along lines 14-14 in FIG. 13. FIG. 14 illustrates the interconnectedness of trays 34 that may be provided according to aspects of the invention. As shown in FIG. 14, tray 34A and tray 34B, which may be substantially identical to tray 34 disclosed above, are mounted in tray holders 36A and 36B, respectively, which also may be substantially identical to tray holder 36 described above. In this aspect, when enclosures 10 are mounted in a row as shown, trays 34A and 34B may be connected whereby tray 34B may be removed when tray 34A is removed. In one aspect, the handles 39, 41 of trays 34A and 34B are adapted to engage each other whereby the forward movement of tray 34A, as indicated by arrow 130, also moves tray 34B. Though trays 34A and 34B may be connected by various conventional means, as shown in FIG. 14, in one aspect, front handle 39 in tray 34B includes a vertical projection 132 adapted to engage a hole or depression 134 in rear handle 41 of tray 34A. Though shown as a vertical projection and a vertical hole in FIG. 14, in one aspect, projection 132 and hole 134 may be oriented horizontally. Other means of engaging tray 34A with tray 34B will be apparent to those of skill in the art. Though only two trays 34A and 34B are shown in FIG. 14, in aspects of the invention, enclosure assembly 100 may include two or more concatenated trays, for example, three or more, or four or more concatenated trays.

Figure 15:
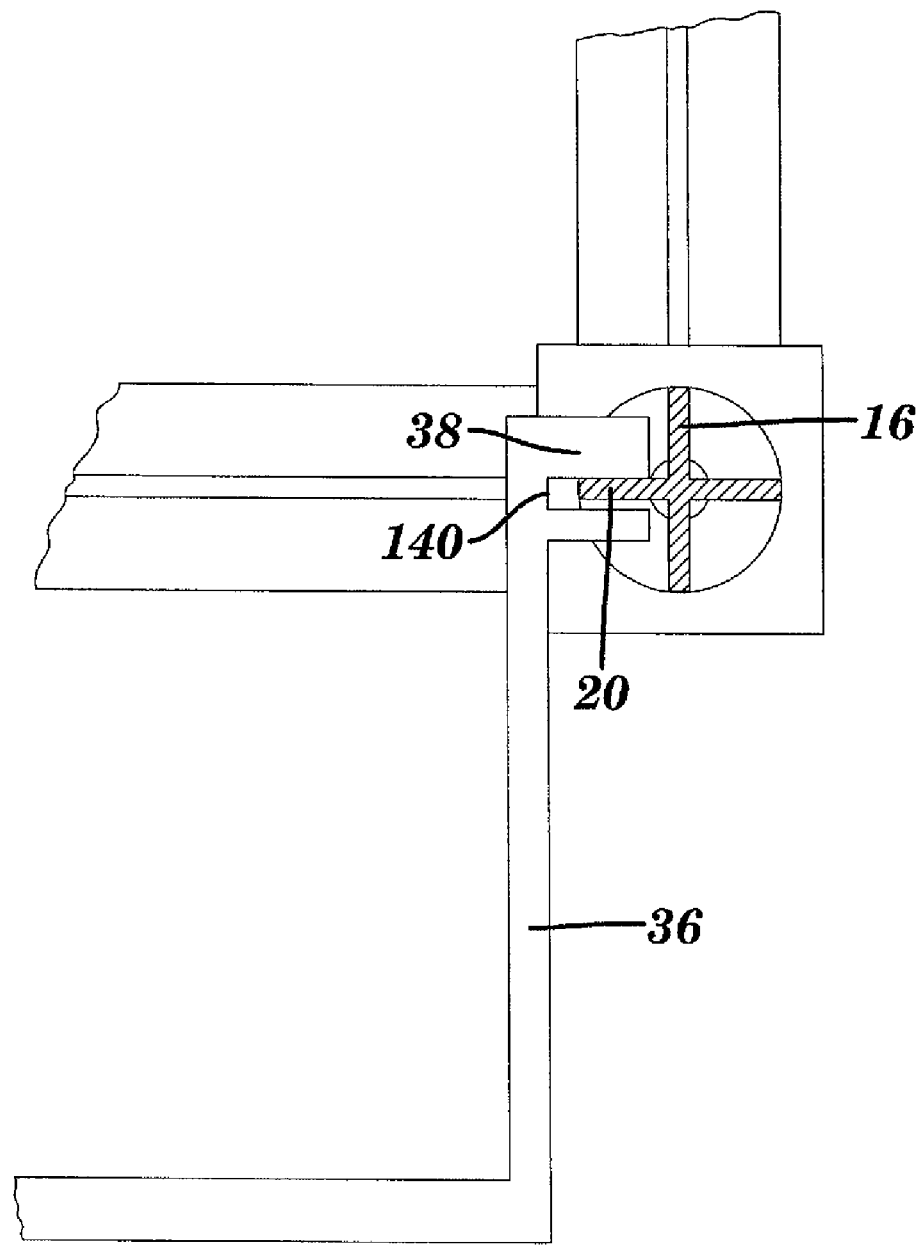
FIG. 15 is a detailed front elevation view of an engagement between a tray holder and horizontal member shown in FIG. 1 according to an aspect of the invention.

FIG. 15 is a detailed front elevation view of an engagement between a tray holder 36 and horizontal member 16 as viewed along section lines 15-15 in FIG. 14 according to an aspect of the invention. As shown in FIG. 15, tray holder 36 holding tray 34 includes a rail 38 having at least one slot 140 adapted to engage a rib 20 of horizontal member 16. Though not shown in FIG. 15, tray holder 36 typically includes a pair of opposite rails 38 adapted to engage ribs 20 in members 16. In one aspect, rails 38 slidably engage ribs 20 whereby tray holders 36 may be slidably removed from engagement with members 16, for example, for servicing or replacement.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A modular enclosure system comprising:
   a frame assembly comprising a plurality of vertical members, a plurality of horizontal members, and a plurality of connectors adapted to engage the horizontal members and the vertical members, wherein the horizontal members and the vertical members are cruciform in cross section and include elongated longitudinal projections extending substantially completely along the length of the horizontal members and the vertical members; and
   a plurality of panel assemblies adapted to removablely mount to the frame assembly, wherein at least one of the plurality of panel assemblies comprises a first end adapted to pivotally engage a first longitudinal projection, and a second end, opposite the first end, having a releasable device adapted to engage a second longitudinal projection;
   wherein the plurality of connectors comprise parallelepipeds having a plurality of faces adapted to receive ends of the plurality of the horizontal members and ends of the plurality of vertical members.

2. The modular enclosure system as recited in claim 1, wherein each of the plurality of panel assemblies comprise a planar section, and the first end of each of the plurality of panel assemblies comprises a horizontal section substantially perpendicular to the planar section and a vertical section substantially perpendicular to the horizontal section, the vertical section adapted to pivotally engage the first longitudinal projection.

3. The modular enclosure system as recited in claim 2, wherein the first longitudinal projection of at least one the horizontal members and the vertical members comprises an inner surface, and wherein the vertical section of the first end is adapted to contact the inner surface.

4. The modular enclosure system as recited in claim 1, wherein at least one of the plurality of panel assemblies is adapted to receive a planar insert.

5. The modular enclosure system as recited in claim 4, wherein the planar insert comprises a perforated insert.

6. The modular enclosure system as recited in claim 1, wherein the enclosure system further comprises a removable tray.

7. The modular enclosure system as recited in claim 6, wherein the enclosure system further comprises a tray holder adapted to support the removable tray.

8. The modular enclosure system as recited in claim 7, wherein the tray holder is adapted to mount to a plurality of longitudinal projections of at least two of the horizontal members.

9. The modular enclosure system as recited in claim 1, the enclosure system comprises a plurality of interconnected enclosures, wherein the plurality of interconnected enclosures share at least two of the plurality of vertical members, at least two of the plurality of horizontal members, and at least two of the plurality of connectors.

10. The modular enclosure system as recited in claim 9, wherein the plurality of interconnected enclosures comprises a plurality of vertically spaced interconnected enclosures and a plurality of horizontally spaced interconnected enclosures.

11. The modular enclosure system as recited in claim 10, wherein the plurality horizontally spaced interconnected enclosures comprise a plurality of horizontally spaced interconnected enclosures spaced in two substantially perpendicular directions.

12. The modular enclosure system as recited in claim 10, wherein the plurality of horizontally spaced interconnected enclosures comprises at least a first enclosure having a first tray and a second enclosure having a second tray engaged with the first tray.

13. The modular enclosure system as recited in claim 1, wherein the enclosure system further comprises at least one horizontal panel adapted to engage the longitudinal projection of a least two horizontal members.

14. The modular enclosure system as recited in claim 1, wherein the at least one of the plurality of panel assemblies comprises a door assembly, and wherein, when the door assembly is pivotally engaged with the first longitudinal projection, the door assembly is adapted to rotate into contact with at least one second longitudinal projection of at least one of the horizontal members and the vertical members.

15. The modular enclosure system as recited in claim 1, wherein the releasable device is adapted to engage at least one of the longitudinal projections of the horizontal members and the vertical members.

16. The modular enclosure system as recited in claim 15, wherein the releasable device comprises a locking mechanism.

17. The modular enclosure system as recited in claim 1, wherein the elongated longitudinal projections of the plurality of vertical members and the plurality of horizontal members comprise a rib of the cruciform cross section.

18. The modular enclosure system as recited in claim 17, wherein the plurality of vertical members and the plurality of horizontal members having cruciform cross sections comprise ends having a projection adapted to engage a hole in one of the plurality of faces of the connectors.

19. The modular enclosure system as recited in claim 1, wherein the plurality of panel assemblies comprises substantially square panel assemblies.

20. The modular enclosure system as recited in claim 1, wherein the enclosure system comprises an animal enclosure system.

21. An expandable modular enclosure system comprising:
   an expandable frame assembly comprising:
      a plurality of vertical members and a plurality of horizontal members, wherein the horizontal members and the vertical members include elongated longitudinal projections extending substantially completely along the length of the horizontal members and the vertical members; and
      a plurality of connectors comprising parallelepipeds having a plurality of faces adapted to receive ends of the plurality of the horizontal members and ends of the plurality of vertical members; and
   a plurality of panel assemblies adapted to pivotally mount to the expandable frame assembly;
   wherein the plurality parallelepiped connectors are adapted to receive at least some of the plurality of vertical members and at least some of the plurality of horizontal members to provide the expandable modular enclosure system.

22. The modular enclosure system as recited in claim 21, wherein the elongated longitudinal projections of the plurality of vertical members and the plurality of horizontal members comprise ribs providing a cruciform cross section.

23. The modular enclosure system as recited in claim 22, wherein the plurality of vertical members and the plurality of horizontal members comprise ends having a projection adapted to engage a hole in one of the plurality of faces of the parallelepiped connectors.

24. The modular enclosure system as recited in claim 21, wherein at least some of the plurality of vertical members comprise internal vertical members and at least some of the plurality of horizontal members comprise internal horizontal members, wherein the internal vertical members and the internal horizontal members provide unencumbered spans between some of the plurality parallelepiped connectors within the modular frame assembly.

25. The modular enclosure system as recited in claim 21, wherein the system further comprises a plurality of interconnected trays supported by the elongated longitudinal projections of some of the plurality of horizontal members.

* * * * *